US009124112B2

(12) United States Patent
Havass et al.

(10) Patent No.: US 9,124,112 B2
(45) Date of Patent: Sep. 1, 2015

(54) ACCELEROMETER-BASED BATTERY CHARGE STATUS INDICATOR

(71) Applicants: Richard Havass, Coconut Creek, FL (US); Robert Koutsoyannis, Coral Springs, FL (US)

(72) Inventors: Richard Havass, Coconut Creek, FL (US); Robert Koutsoyannis, Coral Springs, FL (US)

(73) Assignee: Tyco Fire & Security GmbH, Neuhasen am Rheinfall (CH)

( * ) Notice: Subject to any disclaimer, the term of this patent is extended or adjusted under 35 U.S.C. 154(b) by 165 days.

(21) Appl. No.: 13/927,811

(22) Filed: Jun. 26, 2013

(65) Prior Publication Data

US 2014/0266005 A1    Sep. 18, 2014

Related U.S. Application Data

(60) Provisional application No. 61/785,115, filed on Mar. 14, 2013.

(51) Int. Cl.
*H02J 7/00* (2006.01)
*H02M 1/04* (2006.01)

(52) U.S. Cl.
CPC .............. *H02J 7/0047* (2013.01); *H02J 7/0042* (2013.01); *H02J 7/0044* (2013.01); *H02M 1/04* (2013.01); *H04M 2250/12* (2013.01)

(58) Field of Classification Search
CPC .............................. H02J 7/0044; H02J 7/0047
USPC ......................................................... 320/106
See application file for complete search history.

(56) References Cited

U.S. PATENT DOCUMENTS

| 6,230,860 | B1 | 5/2001 | Wu | |
|---|---|---|---|---|
| 8,250,278 | B2 | 8/2012 | Tseng et al. | |
| 8,324,509 | B2 * | 12/2012 | Ohtsuka et al. | 174/260 |
| 8,527,688 | B2 * | 9/2013 | Chatterjee et al. | 710/303 |
| 8,792,221 | B2 * | 7/2014 | Ramey et al. | 361/90 |
| 2004/0135541 | A1 | 7/2004 | Cho et al. | |
| 2006/0245131 | A1 * | 11/2006 | Ramey et al. | 361/90 |
| 2008/0111518 | A1 * | 5/2008 | Toya | 320/108 |
| 2009/0280871 | A1 * | 11/2009 | Hofer et al. | 455/573 |
| 2010/0039066 | A1 | 2/2010 | Yuon et al. | |
| 2010/0131691 | A1 * | 5/2010 | Chatterjee et al. | 710/303 |
| 2010/0146308 | A1 * | 6/2010 | Gioscia et al. | 713/300 |
| 2011/0059697 | A1 | 3/2011 | Janik | |
| 2012/0246374 | A1 * | 9/2012 | Fino | 710/303 |

(Continued)

FOREIGN PATENT DOCUMENTS

| EP | 1648146 A1 | 4/2006 |
|---|---|---|
| FR | 3001555 A1 | 8/2014 |

(Continued)

*Primary Examiner* — Suchin Parihar
(74) *Attorney, Agent, or Firm* — Robert J. Sacco, Esq.; Carol E. Thorstad-Forsyth, Esq.; Fox Rothschild LLP

(57) ABSTRACT

Systems (100) and methods (600) for recharging a battery (292) of an electronic device (102) which has been placed in a cradle (106) of a charging dock (104). The methods involve: measuring a charging voltage value and a charging current value for the electronic device; determining a first value of angular orientation for a current position of the electronic device relative to a reference angular orientation of the electronic device; selecting at least one first indicator from a plurality of indicators based on the charging voltage value, the charging current value, and the first value of angular orientation; and outputting a first indicator to the user of the electronic device.

14 Claims, 8 Drawing Sheets

(56) References Cited

U.S. PATENT DOCUMENTS

| | | |
|---|---|---|
| 2013/0023312 A1 | 1/2013 | Staebler |
| 2013/0096650 A1* | 4/2013 | Aghassian .................... 607/61 |
| 2013/0265682 A1* | 10/2013 | Ramey et al. .................. 361/79 |

FOREIGN PATENT DOCUMENTS

| | | |
|---|---|---|
| WO | 20100131776 A1 | 11/2010 |
| WO | 20120073204 A2 | 6/2012 |

\* cited by examiner

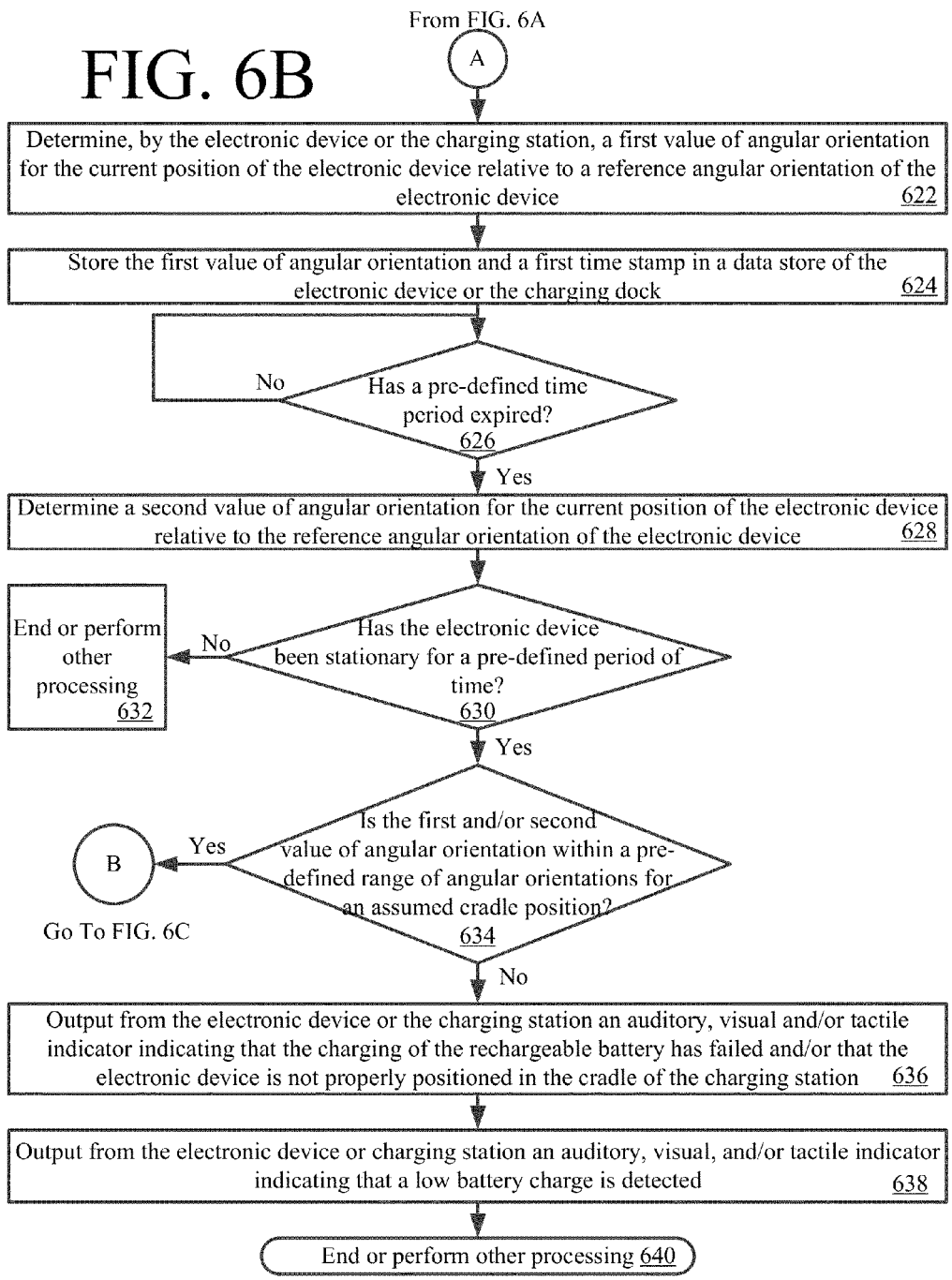

ACCELEROMETER-BASED BATTERY CHARGE STATUS INDICATOR

CROSS REFERENCE TO RELATED APPLICATIONS

This application is a non-provisional application of U.S. Provisional Application No. 61/778,026 filed on Mar. 13, 2013, which is herein incorporated in its entirety.

STATEMENT OF THE TECHNICAL FIELD

The inventive arrangements relate to systems and methods for recharging batteries of an electronic device. More particularly, the inventive arrangements concern systems and methods for providing an indication of a charging status for a battery of an electronic device when the battery is being recharged or is not receiving charge.

DESCRIPTION OF THE RELATED ART

Electronic devices with rechargeable batteries are designed to be recharged by coupling the electronic device to a power source (e.g., an Alternating Current ("AC") power source). This coupling can be achieved directly via a cable or indirectly via a charging dock. The charging dock supplies electric energy for the recharging of a battery disposed within the electronic device. This recharging process may fail for various reasons. For example, the battery may not recharge simply because (1) the charging dock itself is not properly coupled to the power source, (2) the electronic device was incorrectly placed in the charging dock such that an electrical coupling therebetween was not formed, and/or (3) an obstruction (e.g., an object or dust buildup) exists which prevents the electrical coupling between the electronic device and the charging dock.

There are many solutions known in the art for providing feedback to a user indicating that the electronic device is not recharging properly. One such solution involves: sensing whether at least one electrical contact of a connector disposed on the electronic device is not in contact with a respective electrical contact of the charging dock; sensing whether an input voltage of the electronic device is incorrect; and/or outputting information indicating that an electrical coupling between the electronic device and charging dock has not been suitably established for enabling the recharge of the battery. This solution fails when the charging dock is not connected to the power source, and/or when the electronic device is incorrectly placed in the charging dock such that a suitable electrical coupling is not formed between other electrical contacts (i.e., non-sensed electrical contacts) of the electronic device and the charging dock.

SUMMARY OF THE INVENTION

The present invention concerns systems and methods for recharging a battery of an electronic device which has been placed in a cradle of a charging dock. The methods involve performing the following operations by an electronic circuit (e.g., the electronic device or the charging dock): measuring a charging voltage value and a charging current value for the electronic device; determining a first value of angular orientation for a current position of the electronic device relative to a reference angular orientation of the electronic device; selecting at least one first indicator from a plurality of indicators based on the charging voltage value, the charging current value, and the first value of angular orientation; and outputting a first indicator to the user of the electronic device. The indicators can include, but are not limited to, an auditory indicator, a visual indicator, and a tactile indicator.

In some scenarios, the first indicator indicates that: a charging of the battery has failed or a low battery charge has been detected; the electronic device is or is not properly placed in the cradle of the charging dock; the wrong type of charging dock is being used to charge the battery; there is something present in the cradle which is preventing an electrical connection between charging interface connectors of the electronic device and the charging station; and/or the charging station is not electrically coupled to an external power source. Also, the first indictor is further selected based on: results of a determination as to whether the electronic device has been stationary for a pre-defined period of time; and/or results of a determination as to whether the charging voltage and current values are equal to zero.

BRIEF DESCRIPTION OF THE DRAWINGS

Embodiments will be described with reference to the following drawing figures, in which like numerals represent like items throughout the figures, and in which:

FIGS. 6A-6C collectively provide a flow diagram of an exemplary method for recharging a battery of an electronic device.

DETAILED DESCRIPTION

Figure 1:
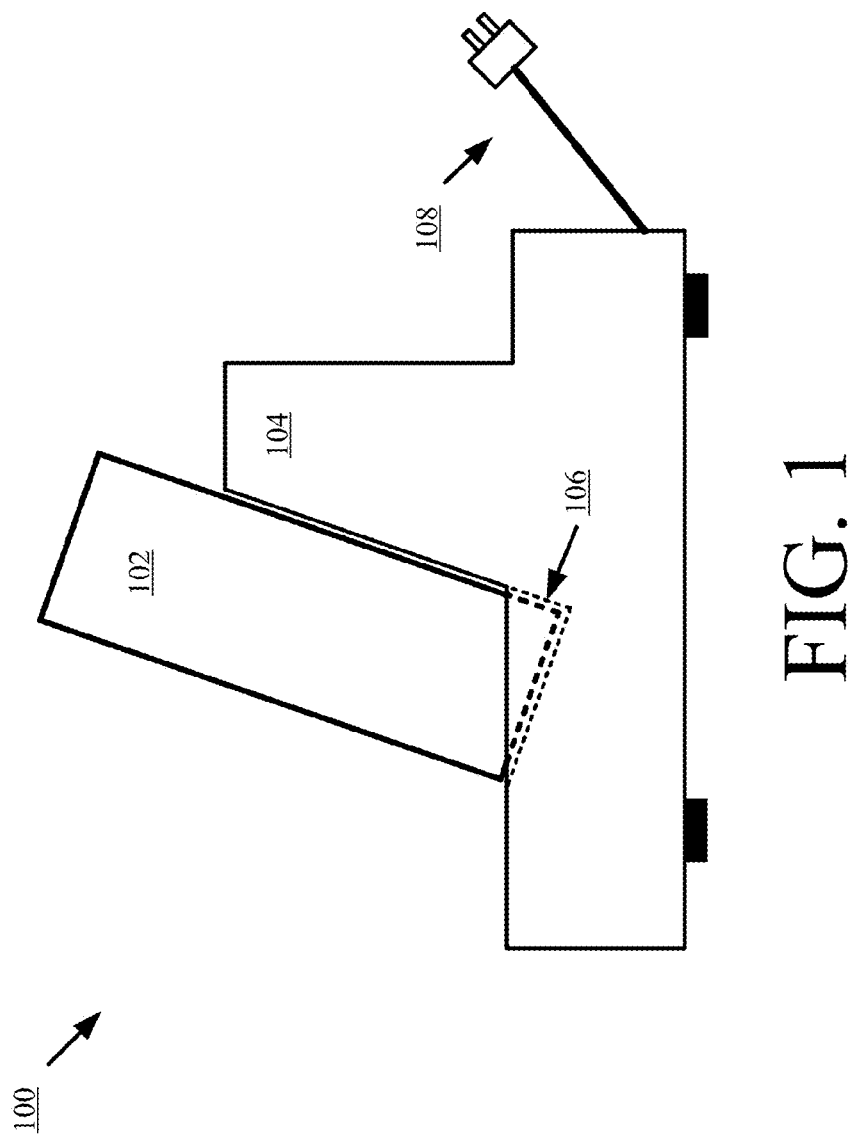
FIG. 1 is a schematic illustration of an exemplary system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects as illustrative. The scope of the invention is, therefore, indicated by the appended claims. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Embodiments will now be described with respect to FIGS. 1-6C. Embodiments generally relate to systems and methods for indicating that an electronic device, which has been placed by a user in its designated cradle of a charging dock, is not receiving charge sufficient to recharge a battery thereof. The solution advantageously informs the user of a charging failure immediately without having to wait for a rechargeable battery of the electronic device to drop to a critically low level. The methods as disclosed herein use charging voltage and current detection in combination with orientation detection for selecting the type information to be output to the user or which indicator of a plurality of indicators is to be output to the user. The detected charging voltage and current is used to determine whether the electronic device is currently being charged, and to detect the difference between a "successful" battery charge condition and an "unsuccessful" battery charge condition. The detected orientation is used to determine whether the electronic device has been sitting for a specified amount of time in a specific directional orientation.

In some scenarios, the electronic device or charging station outputs an auditory, visual and/or tactile indicator based on the results of such determinations. The indicator is of a type that can draw the immediate attention of the user to an "unsuccessful" battery charge attempt, and that can inform the user of the reason(s) for such an "unsuccessful" battery charge attempt. In this regard, the indicator can indicate that: the charging of the rechargeable battery has failed; the electronic device is or is not properly positioned in the cradle of the charging dock; a low battery charge has been detected; the wrong type of charging dock is being used; there is something present in the cradle (e.g., dust) which may be preventing an electrical connection between the charging interface connectors of the electronic device and the charging station; and/or the charging station may not be electrically coupled to a power source.

Referring now to FIG. 1, there is provided a schematic illustration of an exemplary system 100 that is useful for understanding the present invention. System 100 comprises an electronic device 102 and a charging dock 104. The electronic device 102 includes any device with a rechargeable battery (not shown in FIG. 1). Such device can include, but is not limited to, a mobile phone, a Personal Digital Assistant ("PDA"), a portable computer, a portable game station, and a portable telephone. The charging dock 104 is generally configured to recharge the rechargeable battery contained in the electronic device 102. In this regard, the charging dock 104 has a cradle 106 sized and shaped to receive at least a portion of the electronic device 102, as shown in FIG. 1. The cradle 106 includes an interface connector (not shown in FIG. 1) for creating an electrical connection with a corresponding interface connector (not shown in FIG. 1) of the electronic device 102. A retractable connector 108 is provided for electrically coupling the charging dock 104 to a power source (e.g., an AC power source). The interface connectors and retractable connector 108 collectively facilitate the recharging of the rechargeable battery of the electronic device 102.

As shown in FIG. 1, a battery is charged when the electronic device 102 is positioned in the cradle 106 of the charging dock 104 at a tilted orientation (e.g., a titled orientation of 24 degrees relative to a reference position). The tilted orientation is not a typical orientation for the electronic device 102 during normal operations, i.e., when the electronic device 102 is not disposed within the cradle 106. Therefore, a directional orientation of the electronic device 102 can be sensed and used to trigger the output of an indication of a charging status to a user thereof, as discussed below.

Figure 2:
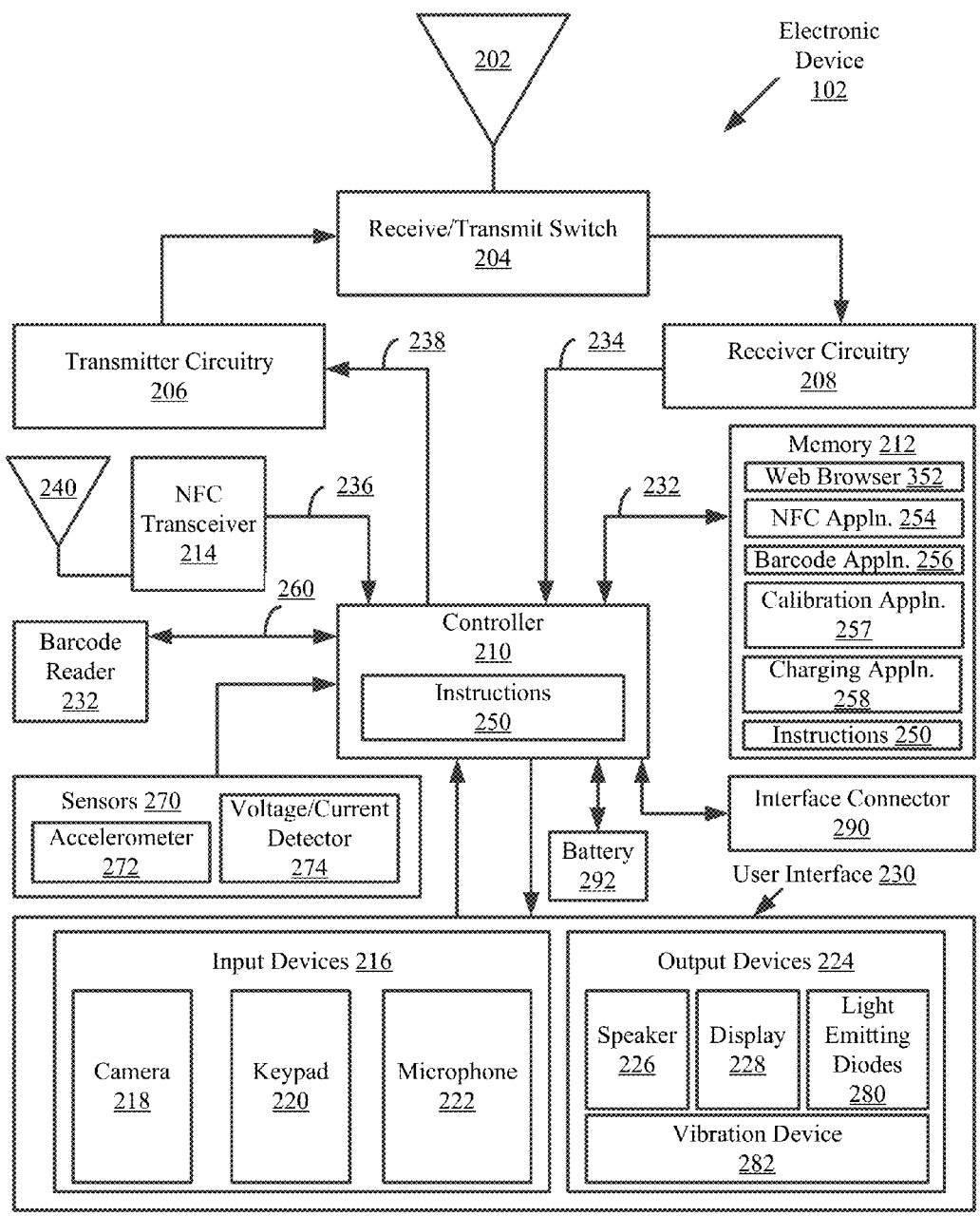
FIG. 2 is a more detailed block diagram of an electronic device shown in FIG. 1.

Referring now to FIG. 2, there is provided a detailed block diagram of an exemplary architecture for the electronic device 102 of FIG. 1. Electronic device 102 may include more or less components than those shown in FIG. 2. However, the components shown are sufficient to disclose an illustrative embodiment implementing the present invention. Some or all of the components of the electronic device 102 can be implemented in hardware, software and/or a combination of hardware and software. The hardware includes, but is not limited to, one or more electronic circuits.

As noted above, electronic device 102 can include, but is not limited to, a notebook computer, a personal digital assistant, a cellular phone, or a mobile phone with smart device functionality (e.g., a Smartphone). In this regard, the electronic device 102 comprises an antenna 202 for receiving and transmitting Radio Frequency ("RF") signals. A receive/transmit ("Rx/Tx") switch 204 selectively couples the antenna 202 to the transmitter circuitry 206 and receiver circuitry 208 in a manner familiar to those skilled in the art. The receiver circuitry 208 demodulates and decodes the RF signals received from an external device. The receiver circuitry 208 is coupled to a controller (or microprocessor) 210 via an electrical connection 234. The receiver circuitry 208 provides the decoded signal information to the controller 210. The controller 210 uses the decoded RF signal information in accordance with the function(s) of the electronic device 102. The controller 210 also provides information to the transmitter circuitry 206 for encoding and modulating information into RF signals. Accordingly, the controller 210 is coupled to the transmitter circuitry 206 via an electrical connection 238. The transmitter circuitry 206 communicates the RF signals to the antenna 202 for transmission to an external device via the Rx/Tx switch 204.

Notably, the electronic device 102 is configured to facilitate the provision of an indication of a charging status for its battery 292 to a user thereof. In this regard, the electronic device 100 comprises an interface connector 290 for creating an electrical connection with a corresponding interface connector of a charging station (e.g., charging station 104 of FIG.

1). The interface connector 290 can include, but is not limited to, a multi-pin connector or a plurality of protruding conductive contacts.

Electronic device 100 also comprises an antenna 240 coupled to a Near Field Communication ("NFC") transceiver 214 for receiving NFC signals. NFC transceivers are well known in the art, and therefore will not be described in detail herein. However, it should be understood that the NFC transceiver 214 processes the NFC signals to extract information therefrom. The NFC transceiver 214 may process the NFC signals in a manner defined by the NFC application 254 installed on the electronic device 102. The NFC application 254 can include, but is not limited to, a Commercial Off The Shelf ("COTS") application. The NFC transceiver 214 provides the extracted information to the controller 210. As such, the NFC transceiver 214 is coupled to the controller 210 via an electrical connection 236. The controller 210 uses the extracted information in accordance with the function(s) of the electronic device 102. For example, the extracted information can be used by the electronic device 102 to determine that it is in proximity of a charging station (e.g., charging station 104 of FIG. 1). Thereafter, the electronic device 102 can initiate a charging status indication process. The charging status indication process will be described in detail below.

The controller 210 may store received and extracted information in memory 212 of the electronic device 102. Accordingly, the memory 212 is connected to and accessible by the controller 210 through electrical connection 232. The memory 212 may be a volatile memory and/or a non-volatile memory. For example, the memory 212 can include, but is not limited, a RAM, a DRAM, an SRAM, a ROM and a flash memory. The memory 212 may also comprise unsecure memory and/or secure memory. The memory 212 can be used to store various other types of information therein, such as authentication information, cryptographic information, location information and various service-related information.

The electronic device 102 also may comprise a barcode reader 232. Barcode readers are well known in the art, and therefore will not be described herein. However, it should be understood that the barcode reader 232 is generally configured to scan a barcode and process the scanned barcode to extract information therefrom. The barcode reader 232 may process the barcode in a manner defined by the barcode application 256 installed on the electronic device 102. Additionally, the barcode scanning application can use camera 218 to capture the barcode image for processing. The barcode application 256 can include, but is not limited to, a COTS application. The barcode reader 232 provides the extracted information to the controller 210. As such, the barcode reader 232 is coupled to the controller 210 via an electrical connection 260. The controller 210 uses the extracted information in accordance with the function(s) of the electronic device 102. For example, the extracted information can be used by the electronic device 102 to determine that it is in proximity of a charging station (e.g., charging station 104 of FIG. 1). Thereafter, the electronic device 102 can initiate a charging status indication process. The charging status indication process will be described in detail below.

As shown in FIG. 2, one or more sets of instructions 250 are stored in memory 212. The instructions 250 may include customizable instructions and non-customizable instructions. The instructions 250 can also reside, completely or at least partially, within the controller 210 during execution thereof by electronic device 102. In this regard, the memory 212 and the controller 210 can constitute machine-readable media. The term "machine-readable media", as used here, refers to a single medium or multiple media that stores one or more sets of instructions 250. The term "machine-readable media", as used here, also refers to any medium that is capable of storing, encoding or carrying the set of instructions 250 for execution by the electronic device 102 and that causes the electronic device 102 to perform one or more of the methodologies of the present disclosure.

The controller 210 is also connected to a user interface 230. The user interface 230 comprises input devices 316, output devices 324 and software routines (not shown in FIG. 3) configured to allow a user to interact with and control software applications (e.g., application software 252-258 and other software applications) installed on the electronic device 102. Such input and output devices may include, but are not limited to, a display 228, a speaker 226, a keypad 220, a directional pad (not shown in FIG. 2), a directional knob (not shown in FIG. 2), a microphone 222 and a camera 218. The display 228 may be designed to accept touch screen inputs. As such, user interface 230 can facilitate a user-software interaction for launching applications (e.g., application software 252-258) installed on the electronic device 102. The user interface 230 can facilitate a user-software interactive session for: initiating communications with an external device; writing data to and reading data from memory 212; initiating a calibration process for calibrating the electronic device 102 with a specific charging station (e.g., charging station 104 of FIG. 1); and/or initiating a charging status indication process. The calibration process and the charging status indication process will be described in detail below.

The display 228, keypad 220, directional pad (not shown in FIG. 2) and directional knob (not shown in FIG. 2) can collectively provide a user with a means to initiate one or more software applications or functions of the electronic device 102. The application software 254-258 can facilitate the data exchange (a) between a user and the electronic device 102 and (b) between the electronic device 102 and a charging dock (e.g., charging dock 104 of FIG. 1). In this regard, the application software 354-358 performs one or more of the following: verify an identity of a user of the electronic device 102 via an authentication process; present information to the user indicating that her/his identity has been or has not been verified; present a Graphical User Interface ("GUI") to the user for enabling the user to initiate a calibration process for calibrating the electronic device 102 with a specific charging station (e.g., charging station 104 of FIG. 1); and/or present a GUI to the user for enabling the user to initiate a charging indication process for providing an indication of a charging status for its battery 292 to a user thereof.

The calibration process can generally involve: prompting a user of the electronic device 102 to manually input charging station information or prompting the user of the electronic device 102 to place the electronic device in proximity to the charging station; obtaining the charging station information manually from the user or automatically from the charging station via a short range communication (e.g., barcode communication or NFC communication); storing the charging station information in memory 212 for later use in the charging indication process. The charging station information can include, but is not limited to, a pre-defined range of angular orientations for an assumed cradle position of an electronic device. The calibration process will become more evident as the discussion progresses. In this regard, the calibration process will be described in more detail below in relation to FIGS. 6A-6C.

The charging indication process generally involves detecting when it is in proximity to the charging station (e.g., charging station 104 of FIG. 1); and initializing indication operations when such detection is made. In some scenarios, such detection can be achieved using the barcode reader 232, the NFC transceiver 214, and/or a sensor 270 of the electronic device 102. In the barcode scenario, the barcode reader 232 can scan a barcode disposed on an outer surface of the charging dock so as to obtain charging dock information, such as a serial, make or model number. In the NFC transceiver 214 scenario, the electronic device can obtain the charging dock information from the charging dock via a short range communication (e.g., a near field communication). In the sensor 270 scenario, a presence of an object adjacent to the electronic device may simply be sensed. Methods for sensing the presence of an adjacent object are well known in the art, and therefore will not be described herein. Any known or to be known method for sensing an adjacent object can be used herein without limitation.

The indication operations can also involve: determining whether or not the charging of battery 292 has failed; determining the reason(s) for such failure; detecting a low battery charge of the battery 292; and/or outputting an indication indicating that the charging of the battery has failed, the reasons for such failure, and/or the detection of the low battery charge. These determinations are based on detected values for a charging voltage, a charging current, and/or a directional orientation of the electronic device. The charging voltage and current values can be detected by a voltage/current detector 274 of sensors 270. The directional orientation can be detected by a position detection sensor 272 (e.g., an accelerometer) of sensors 270. The reasons for a charging failure include, but are not limited to: the charging station is not electrically coupled to a power source; the electronic device is not positioned properly in the cradle of the charging station; an incorrect charging station is being used; and/or an obstruction exists within the cradle of the charging station which prevents an electrical coupling between the electronic device and the charging station. The indicator can include an auditory, visual and/or tactile indication. As such, the electronic device 102 comprises a speaker 226 for providing an auditory indicator, a display 228 for providing a visual indicator, Light Emitting Diodes ("LEDs") 280 for providing visual indictors, and a vibration device 282 for providing a tactile indictor. The charging indication process will become more evident as the discussion progresses. In this regard, the charging indication process will be described in more detail below in relation to FIGS. 6A-6C.

Figure 3:
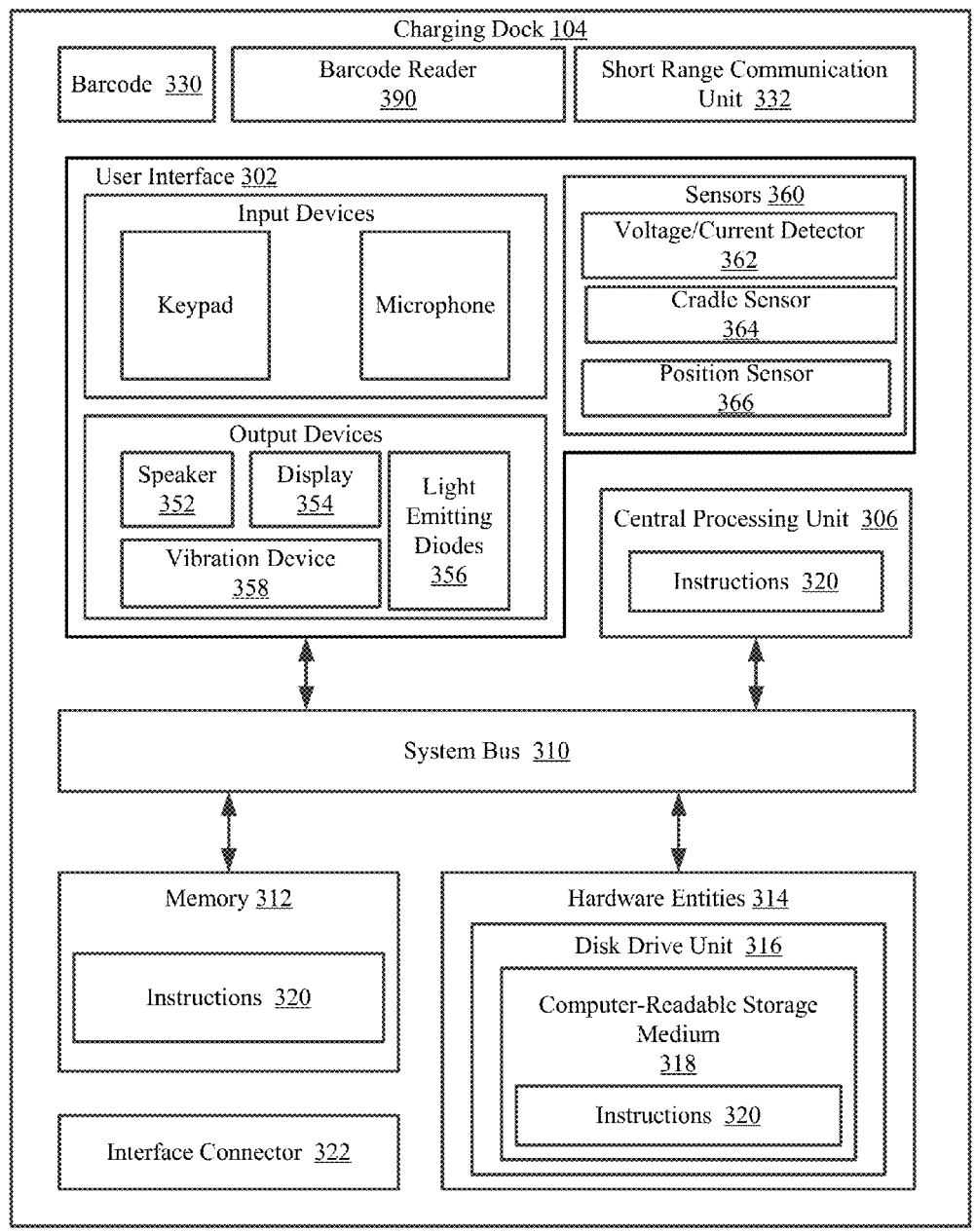
FIG. 3 is a more detailed block diagram of a charging dock shown in FIG. 1.

Referring now to FIG. 3, there is provided a detailed block diagram of an exemplary architecture for the charging station 104 shown in FIG. 1. Notably, the charging station 104 may include more or less components than those shown in FIG. 3. However, the components shown are sufficient to disclose an illustrative embodiment implementing the present invention. The hardware architecture of FIG. 3 represents one embodiment of a representative charging station configured to facilitate the provision of an indication of a charging status for a battery (e.g., battery 292 of FIG. 2) of an electronic device (e.g., electronic device 102 of FIG. 1) to a user thereof. As such, the computing device 102 of FIG. 2 implements methods for providing such indication in accordance with embodiments of the present invention. Some or all the components of the computing device 102 can be implemented as hardware, software and/or a combination of hardware and software. The hardware includes, but is not limited to, one or more electronic circuits.

As shown in FIG. 3, the charging station 104 includes an interface connector 322. Interface connector 322 allows the charging station 104 to recharge a battery (e.g., battery 292 of FIG. 2) of an electronic device (e.g., electronic device 102 of FIG. 1) disposed within a cradle (e.g., cradle 106 of FIG. 1) thereof. In this regard, the interface connector 322 facilitates the formation of an electrical connection between the electronic device and the charging station, as described herein.

The charging station 104 also comprises a user interface 302, a Central Processing Unit ("CPU") 306, a system bus 310, a memory 312 connected to and accessible by other portions of charging station 104 through system bus 310, and hardware entities 314 connected to system bus 310. At least some of the hardware entities 314 perform actions involving access to and use of memory 312, which can be a Random Access Memory ("RAM"), a disk driver and/or a Compact Disc Read Only Memory ("CD-ROM"). The charging station 104 also comprises sensors 360, a barcode 330, a barcode reader 390 and a SRC unit 332.

Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the charging station 104. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 220 for execution by the charging station 104 and that cause the charging station 104 to perform any one or more of the methodologies of the present disclosure.

In some embodiments of the present invention, the hardware entities 314 include an electronic circuit (e.g., a processor) programmed for facilitating the provision of an indication of a charging status for a battery (e.g., battery 292 of FIG. 2) of an electronic device (e.g., electronic device 102 of FIG. 1) to a user thereof. In this regard, it should be understood that the electronic circuit can access and run software applications (not shown in FIG. 3) installed on the charging station 104. The software applications are generally operative to facilitate: the detection of the presence of an electronic device (e.g., electronic device 102 of FIG. 1) within a cradle 106 of the charging station 104; and the initialization of charging operations when the presence of the electronic device is detected. In some scenarios, such detection can be achieved using the barcode reader 390, the NFC unit 332, and/or a cradle sensor 364 of the charging dock 104. In the barcode scenario, the barcode reader 390 can scan a barcode disposed on an outer surface of the electronic device so as to obtain electronic device information, such as a serial, make or model number. In the SRC unit 332 scenario, the charging station can obtain the electronic device information from the electronic device via a short range communication (e.g., a near field communication). In the cradle sensor 364 scenario, a presence of an object within the cradle 106 may simply be sensed. Methods for sensing the presence of an object in a given area are well known in the art, and therefore will not be described herein. Any known or to be known method for sensing the presence of an object can be used herein without limitation.

The charging operations can involve: charging a battery (e.g., battery 292 of FIG. 2) of an electronic device (e.g., electronic device 102 of FIG. 1) disposed within a cradle 106 of the charging station 104; determining whether or not the charging of the battery has failed; determining the reason(s) for such failure; detecting a low battery charge of the battery; and/or outputting an indication indicating that the charging of the battery has failed, the reasons for such failure, and/or the detection of the low battery charge. These determinations made in the charging indication process are based on detected values for a charging voltage, a charging current, and/or a directional orientation of the electronic device. The charging voltage and current can be detected by a voltage/current detector 362 of the charging dock 104. The directional orientation of the electronic device can be detected by a position sensor 366 of the charging dock 104. The position sensor 366 can include, but is not limited to, an accelerometer. The reasons for a charging failure include, but are not limited to: the charging station is not electrically coupled to a power source; the electronic device is not positioned properly in the cradle of the charging station; an incorrect charging station is being used; and/or an obstruction exists within the cradle of the charging station which prevents an electrical coupling between the electronic device and the charging station. The indicator can be an auditory, visual and/or tactile indicator. In this regard, the charging station 104 comprises a speaker 352 for providing an auditory indicator, a display 354 for providing a visual indicator, LEDs 356 for providing visual indicators, and a vibration device 358 for providing a tactile indicator. The charging operations will become more evident as the discussion progresses. In this regard, the charging indication process will be described in more detail below in relation to FIGS. 6A-6C.

Figures 4A, 4B, 4C:
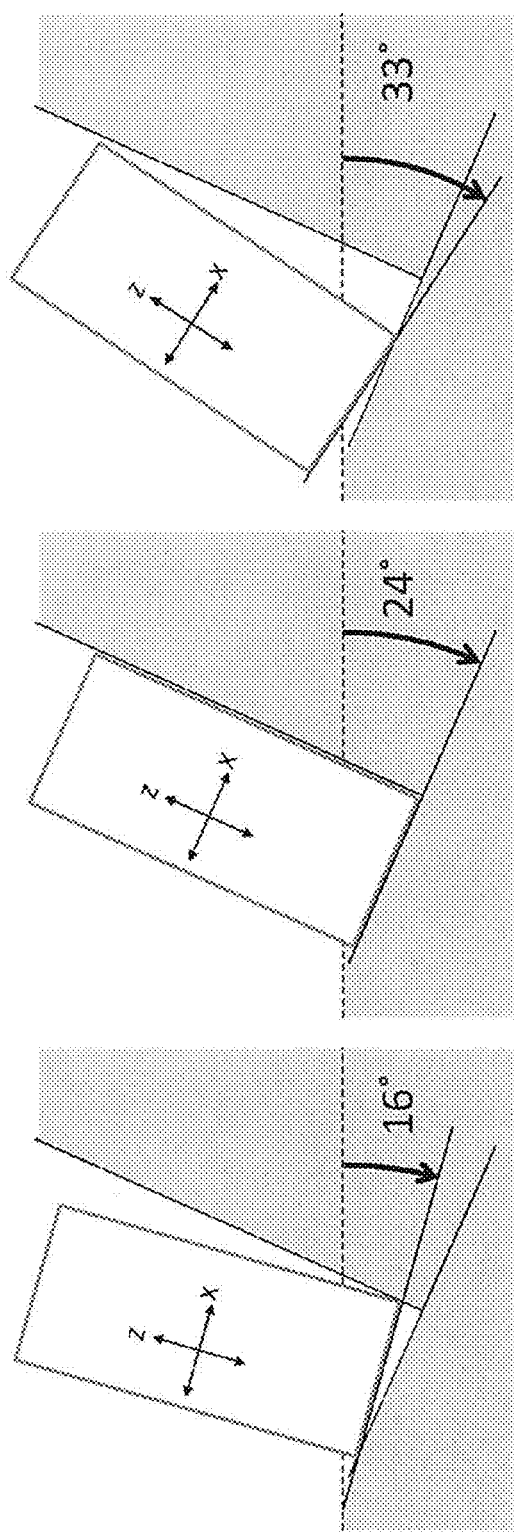
FIGS. 4A-4C each provide a schematic illustration of an angular orientation of the electronic device of FIG. 1 relative to a reference angular orientation.
Figure 5:
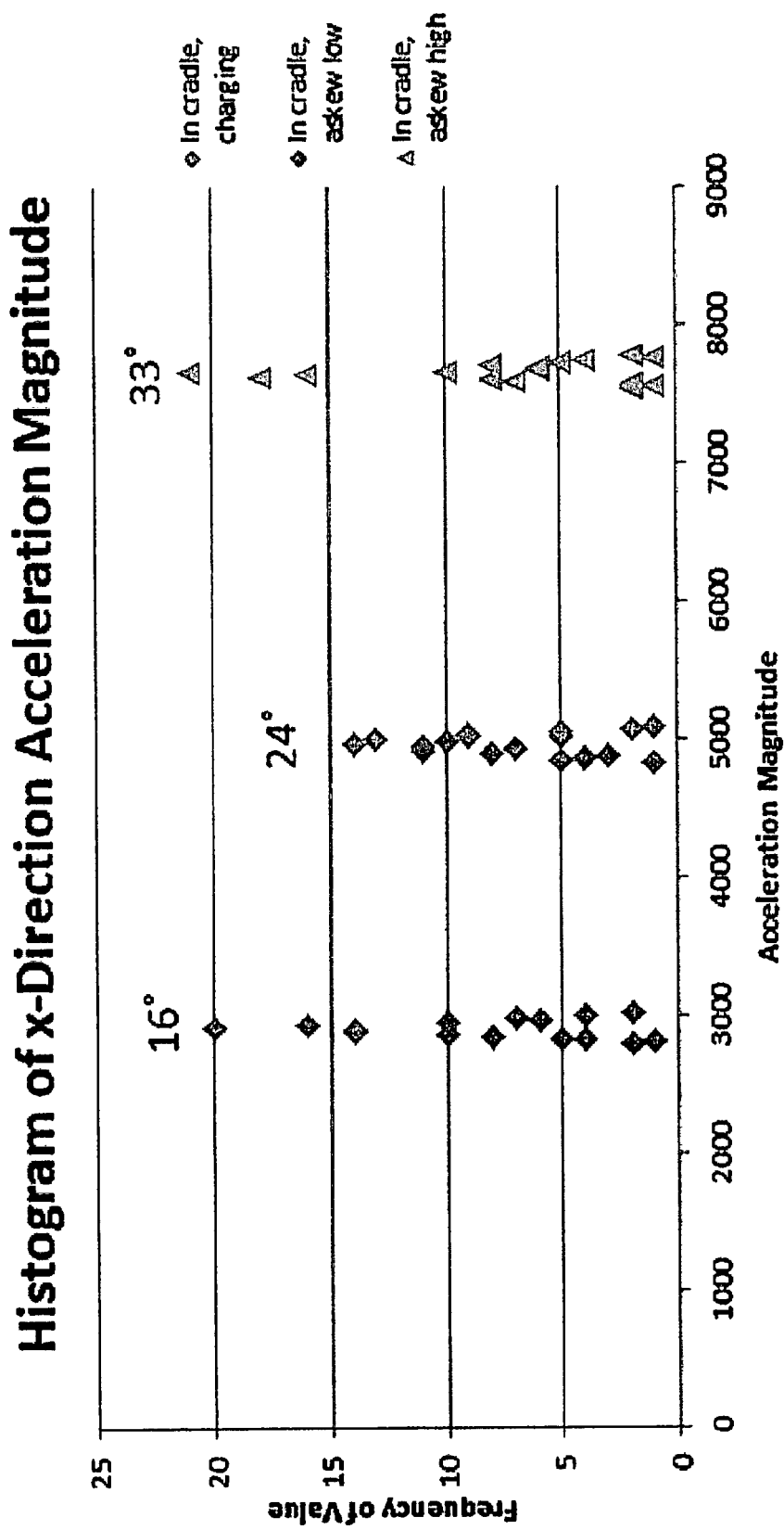
FIG. 5 is a histogram of acceleration magnitude data for the angular orientations shown in FIGS. 4A-4C on the x-axis of the electronic device.

As noted above, electronic device 102 and/or charging station 104 may include a position sensor 272, 366 for detecting the directional orientation of the electronic device 102 when it is disposed within a cradle 106 of the charging station 104. This position sensor is generally configured to sense the subtle differences between angular positions of the electronic device, such as those shown in FIGS. 4A-4C. In this regard, the position sensor 272, 366 is configured to sense and store x, y and z acceleration magnitude data specifying a directional orientation of the electronic device 102. Such acceleration magnitude data allows subtle differences in angular orientation to be accurately distinguishable. FIG. 5 provides a histogram of acceleration magnitude data for the angular positions on the x-axis of the electronic device, as shown in FIGS. 4A-4C. Notably, the data distinguishes each of the listed angles with marginal variance.

In some scenarios, the electronic device 102 and/or charging station 104 determines if the directional orientation of the electronic device is in a proper "cradle" range by setting the acceptable range x, y and z accelerometer magnitude. The x and z data will change significantly from an angular rotation, but the y data should not change because the electronic device pivots the y axis. The acceptable range for the x, y and z accelerometer magnitude may be preset, i.e., programmed at the time of manufacture of the electronic device based on known configurations of the electronic device and the cradle. Alternatively, the electronic device can be calibrated to a specific charging dock. In the calibration scenario, the x, y and z accelerometer magnitude values can be manually input by the user, automatically obtained via a user selection of a menu item of a GUI, and/or automatically obtained using charging station data received via a barcode read or a short range communication. The ability to calibrate the electronic device may be useful if the electronic device were being used with an after-market charging dock which may not precisely match the angle of the originally manufactured charging dock.

Figure 6A:
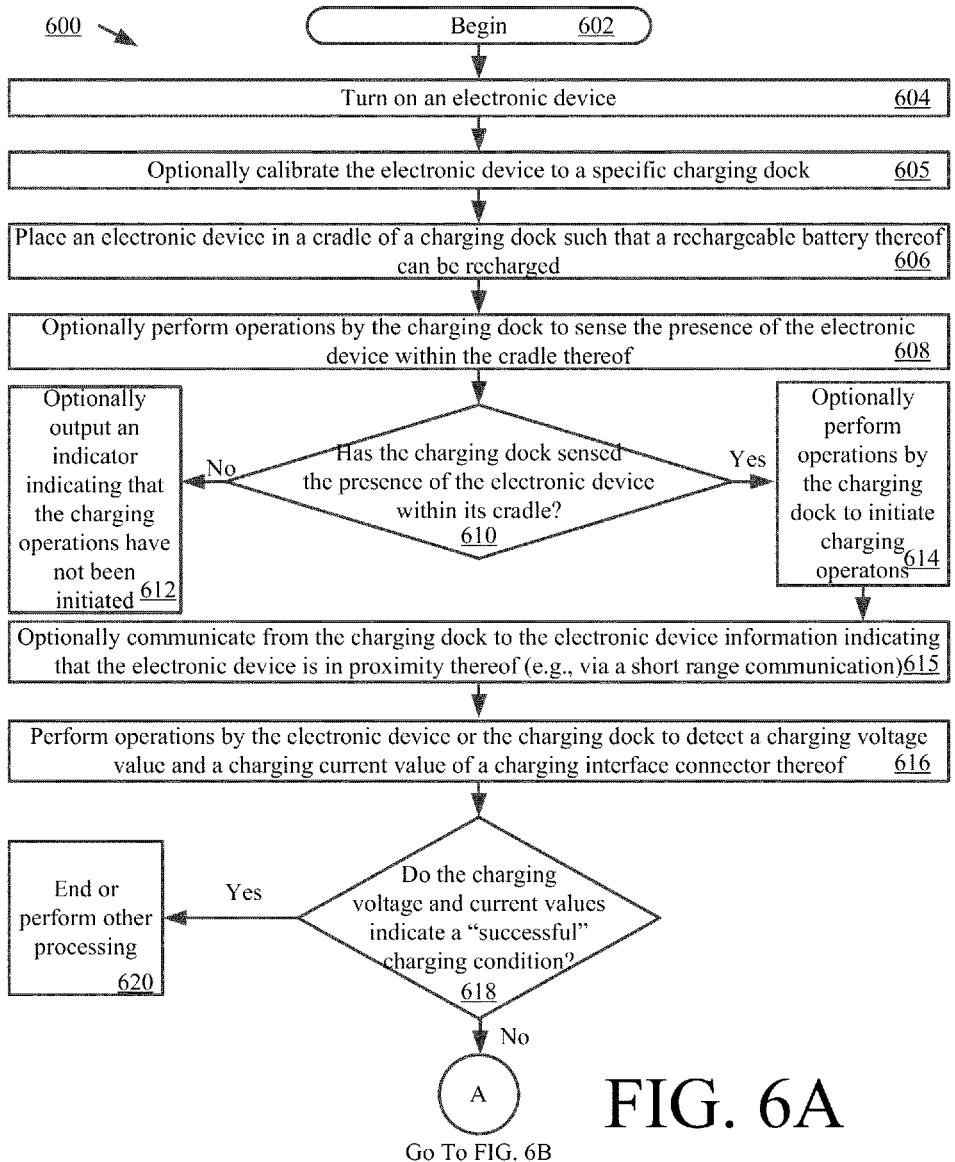
Figure 6C:
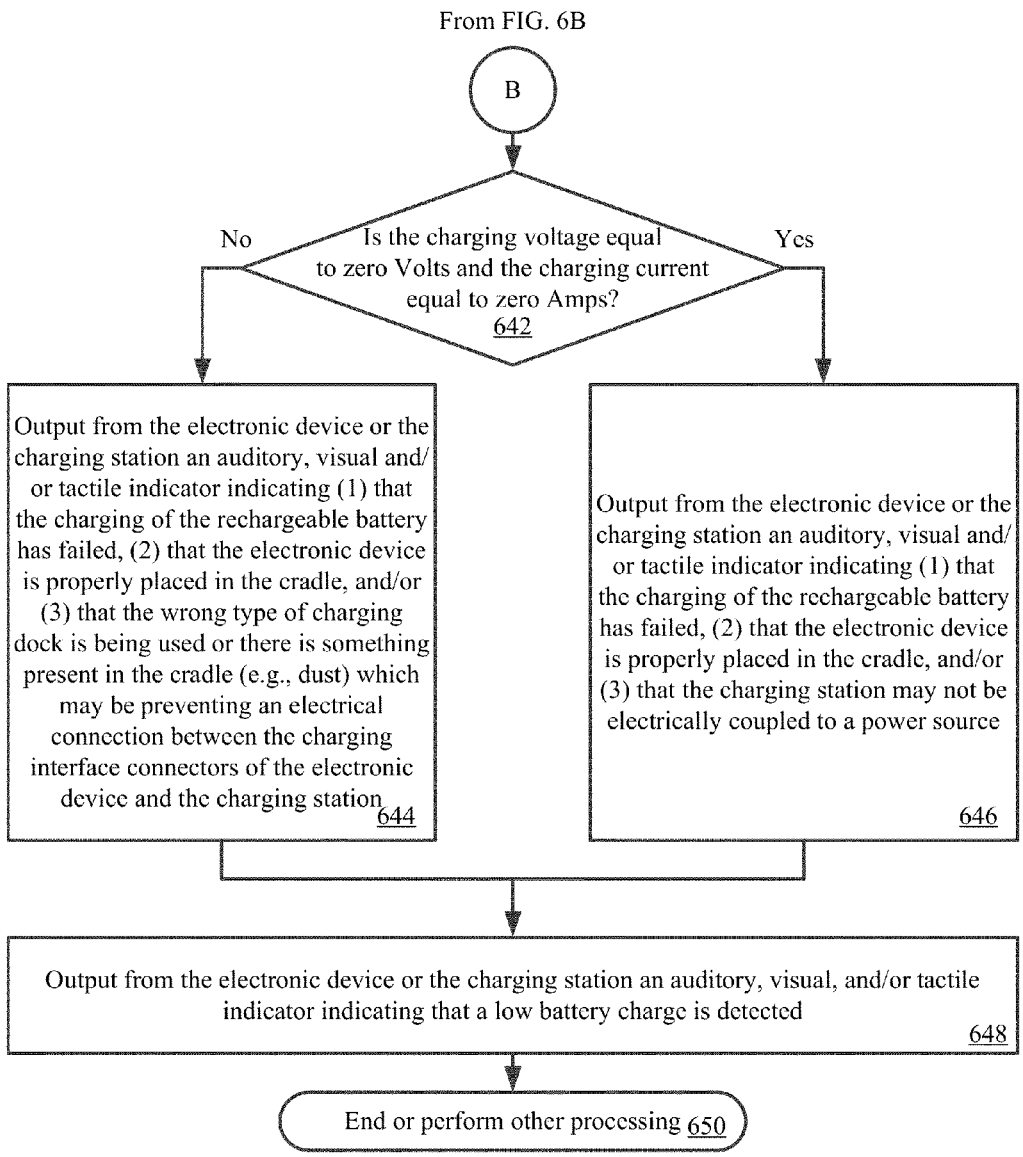

Referring now to FIGS. 6A-6C, there is provided a flow diagram of an exemplary method 600 for recharging a battery (e.g., battery 292 of FIG. 2) of an electronic device (e.g., electronic device 102 of FIGS. 1-2). Method 600 begins with step 602 and continues with step 604 where the electronic device is turned on. In a next optional step 605, the electronic device is calibrated to a specific charging dock (e.g., charging dock 104 of FIGS. 1 and 3). The calibration can involve: receiving a user input specifying a value for an angular orientation of an assumed cradle position or values for a range of angular orientations of the assumed cradle position; receiving a user input selecting a type of charging dock from a menu; retrieving at least one value of the angular orientation which is associated in a data store with the type of charging dock selected by the user; and/or retrieving information from the charging dock via a short range communication (e.g., a barcode communication or an NFC communication). Once the value(s) of angular orientation for an assumed cradle position are obtained by the electronic device, step 606 is performed where the electronic device is placed in a cradle (e.g., cradle 106 of FIG. 1) of the charging dock such that its rechargeable battery (e.g., battery 292 of FIG. 2) can be recharged.

If the charging dock is electrically coupled to a power source, then method 600 can continue with optional steps 608-614. Optional step 608 involves performing operations by the charging dock to sense the presence of the electronic device within the cradle thereof. If the charging dock has not sensed the presence of the electronic device within its cradle [610:NO], then step 612 is performed where the charging station outputs an indicator indicating that the charging operations thereof have not been initiated. This indicator can be an auditory, visual and/or tactile indicator. In contrast, if the charging dock has sensed the presence of the electronic device within its cradle [610:YES], then step 614 is performed where the charging operations of the charging station are initiated.

The remaining steps of method 600 define charging indication operations which can be performed by the electronic device and/or the charging dock. If the charging indication operations are performed by the electronic device, then an optional step 615 can be performed to initiate said charging indication operations thereof. Step 615 involves communicating from the charging dock to the electronic device information indicating that the electronic device is in proximity thereof. This communication can be achieved via a short range communication (e.g., a barcode communication or an NFC communication). Additionally or alternatively, this communication can be achieved using a sensor (e.g., sensor 270 of FIG. 2).

Next, method 600 continues with step 616. In step 616, the electronic device and/or charging station perform operations to detect a charging voltage value and a charging current value of a charging interface (e.g., interface connector 290 of FIG. 2 or 322 of FIG. 3). If the charging voltage and current values indicate a "successful" charging condition [618:YES], then method 600 ends or other processing is performed. A "successful" charging condition can be detected by: determining whether the charging voltage is equal to or greater than a pre-defined charging voltage; determining whether the charging current is equal to or greater than a pre-defined charging current; and deciding that the "successful" charging condition exists if the charging voltage and current values are equal to or greater than the pre-defined values, respectively. Alternatively, step 618 can involve: determining a first difference value by comparing the charging voltage to the pre-defined charging voltage; determining a second difference value by comparing the charging current to the pre-defined charging current; and identifying the charging state of the electronic device based on the first and second difference values (e.g., using a list stored in a data store of the electronic device and/or charging dock).

If the charging voltage and current values do not indicate a "successful" charging condition [618:NO], then method 600 continues with step 622 of FIG. 6B. Step 622 involves determining a first value of an angular orientation for a current position of the electronic device relative to a reference angular orientation of the electronic device. The first value of angular orientation is then stored in a data store (e.g., memory 212 of FIG. 2 and/or memory 312 of FIG. 3) of the electronic device and/or charging dock, as shown by step 624. A timestamp may be stored along with the first value of angular orientation.

Thereafter, the electronic device and/or charging dock wait for a pre-defined period of time. When the pre-defined period of time has expired [626:YES], then a second value of angular orientation is determined for the current position of the electronic device relative to the reference angular orientation of the electronic device, as shown by step 628. Next, a decision is made in step 630 as to whether the electronic device has been stationary for a pre-defined period of time. Step 630 can involve determining if the second value of angular orientation is equal to the first value of angular orientation. If it is determined that the electronic device has not been stationary for the pre-defined period of time [630:NO], then step 632 is performed where method 600 ends or other processing is performed. If it is determined that the electronic device has been stationary for the pre-defined period of time [630:YES], then a decision step 634 is performed.

In step 634, it is determined if the first and/or second values of angular orientation fall within a pre-defined range of angular orientations for an assumed cradle position. As noted above, the pre-defined range of angular orientations for the assumed cradle position can be preset at the factory, or alternatively obtained via a calibration process.

If the first and/or second values of angular orientation do not fall within a pre-defined range of angular orientations for an assumed cradle position [634:NO], then the electronic device and/or charging dock output an indicator to the user thereof, as shown by step 636. The indicator may be an auditory, visual and/or tactile indicator. The indicator may indicate that the charging of the rechargeable battery has failed and/or that the electronic device is not properly positioned in the cradle of the charging station. An indicator can also be provided to the user indicating that a low battery charge is detected, as shown by step 638. Thereafter, step 640 is performed where method 600 ends or other processing is performed.

If the first and/or second values of angular orientation fall within a pre-defined range of angular orientations for an assumed cradle position [634:YES], then method 600 continues with a decision step 642 of FIG. 6C in which a determination is made as to whether the charging voltage is equal to zero Volts and whether the charging current is equal to zero Amps.

If the charging voltage is not equal to zero Volts and/or the charging current is not equal to zero Amps [642:NO], then step 644 is performed. In step 644, the electronic device and/or charging dock output an auditory, visual and/or tactile indicator indicating that: the charging of the rechargeable battery has failed; the electronic device is properly placed in the cradle; and/or the wrong type of charging dock is being using or there is something present in the cradle (e.g., dust) which may be preventing an electrical connection between the charging interface connectors of the electronic device and charging dock. The electronic device and/or charging dock may also output an auditory, visual and/or tactile indicator indicating that a low battery charge has been detected, as shown by step 648. Next, step 650 is performed where method 600 ends or other processing is performed.

If the charging voltage is equal to zero Volts and the charging current is equal to zero Amps [642:YES], then step 646 is performed. In step 646, the electronic device and/or charging dock output an auditory, visual and/or tactile indicator indicating that: the charging of the rechargeable battery has failed; the electronic device is properly placed in the cradle; and/or the charging dock may not be electrically coupled to a power source. The electronic device and/or charging dock may also output an auditory, visual and/or tactile indicator indicating that a low battery charge has been detected, as shown by step 648. Next, step 650 is performed where method 600 ends or other processing is performed.

As noted above, the electronic device and/or charging dock may be configured to not only alert the user of an unsuccessful battery charge, but also to indicate to the user the exact nature of the charging failure. For example, the electronic device and/or charging dock may include a series of LEDs, where one LED might indicate that the cradle is possibly unplugged and another LED may indicate that the electronic device in the cradle is not making proper contact. If the electronic device and/or charging dock has a display screen, then the device can be configured to provide a combination of audible and visual alert indictors. For example, the alert indicating that the charging dock is not plugged in could be an audible alert, e.g., a beeping tone, while the alert for improper contact may be a visual alert.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for recharging a battery of an electronic device which has been placed in a cradle of a charging dock, comprising:
   measuring, by an electronic circuit, a charging voltage value and a charging current value for the electronic device;
   detecting, by a position sensor of the electronic device or the charging dock, a first angular orientation for a current position of the electronic device when the electronic device has been disposed in the cradle of the charging dock;
   determining, by the electronic circuit, whether the angular orientation is in a proper cradle range by comparing a first value of the angular orientation to a pre-defined second value of at least one reference angular orientation of the electronic device;
   in response to a determination that the angular orientation is in the proper cradle range:
   selecting, by the electronic circuit, at least one first indicator from a plurality of indicators to be output from the electronic device when both the charging voltage value and the charging current value equal zero, where the first indicator indicates that the charging dock may not be electrically coupled to a power source;

selecting, by the electronic circuit, at least one second indicator from the plurality of indicators to be output from the electronic device or charging dock when both the charging voltage value and the charging current value do not equal zero, where the second indicator indicates that the charging dock may be of a wrong type for charging the electronic device;

in response to a determination that the angular orientation is not in the proper cradle range, selecting, by the electronic circuit, at least one third indicator from the plurality of indicators to be output from the electronic device or charging dock; and outputting, by the electronic circuit, the first, second or third indicator to the user of the electronic device.

2. The method according to claim 1, wherein the electronic circuit comprises the electronic device or the charging dock.

3. The method according to claim 1, wherein the plurality of indicators comprises an auditory indicator, a visual indicator, and a tactile indicator.

4. The method according to claim 1, wherein the first or second indicator further indicates that a charging of the battery has failed.

5. The method according to claim 1, wherein the first indicator further indicates that the electronic device is properly placed in the cradle of the charging dock.

6. The method according to claim 1, wherein the second indicator indicates that there is something present in the cradle which is preventing an electrical connection between charging interface connectors of the electronic device and the charging station, as opposed to indicating that the charging dock may be of a wrong type for charging the electronic device.

7. The method according to claim 1, wherein the first indictor is further selected based on results of a determination as to whether the electronic device has been stationary for a pre-defined period of time.

8. A system, comprising:
an electronic device having a rechargeable battery;
a charging dock comprising a cradle configured to receive the electronic device; and
an electronic circuit configured to
measure a charging voltage value and a charging current value for the electronic device,
receive a first angular orientation for a current position of the electronic device which was detected by a position sensor of the electronic device or the charging dock when the electronic device was disposed in the cradle of the charging dock,
determine whether the angular orientation is in a proper cradle range by comparing a first value of the angular orientation to a pre-defined second value of at least one reference angular orientation of the electronic device,
in response to a determination that the angular orientation is in the proper cradle range:
select at least one first indicator from a plurality of indicators to be output from the electronic device when both the charging voltage value and the charging current value equal zero, where the first indicator indicates that the charging dock may not be electrically coupled to a power source,
select at least one second indicator from the plurality of indicators to be output from the electronic device or charging dock when both the charging voltage value and the charging current value do not equal zero, where the second indicator indicates that the charging dock may be of a wrong type for charging the electronic device;
in response to a determination that the angular orientation is not in the proper cradle range, selecting at least one third indicator from the plurality of indicators to be output from the electronic device or charging dock; and
output the first, second or third indicator to the user of the electronic device.

9. The system according to claim 8, wherein the electronic circuit is contained in the electronic device or the charging dock.

10. The system according to claim 8, wherein the plurality of indicators comprises an auditory indicator, a visual indicator, and a tactile indicator.

11. The system according to claim 8, wherein the first or second indicator indicates that a charging of the battery has failed.

12. The system according to claim 8, wherein the first indicator further indicates that the electronic device is properly placed in the cradle of the charging dock.

13. The system according to claim 8, wherein the second indicator indicates that there is something present in the cradle which is preventing an electrical connection between charging interface connectors of the electronic device and the charging station, as opposed to indicating that the charging dock may be of the wrong type for charging the electronic device.

14. The system according to claim 8, wherein the first indictor is further selected based on results of a determination as to whether the electronic device has been stationary for a pre-defined period of time.

* * * * *